(12) United States Patent
Hardin et al.

(10) Patent No.: US 7,114,163 B2
(45) Date of Patent: Sep. 26, 2006

(54) SOFTWARE COMPONENT MODEL FOR TIME SENSITIVE EMBEDDED APPLICATIONS

(76) Inventors: David S. Hardin, 2350 Glass Rd. NE., Cedar Rapids, IA (US) 52402; Michael J. Frerking, 2135 Winchester Dr., Marion, IA (US) 52302; Philip J. Wiley, 2800 Twenty-Fourth St., Marion, IA (US) 52302

( * ) Notice: Subject to any disclaimer, the term of this patent is extended or adjusted under 35 U.S.C. 154(b) by 537 days.

(21) Appl. No.: 10/093,943

(22) Filed: Mar. 7, 2002

(65) Prior Publication Data

US 2002/0163520 A1 Nov. 7, 2002

Related U.S. Application Data

(60) Provisional application No. 60/273,858, filed on Mar. 7, 2001.

(51) Int. Cl.
*G06F 9/44* (2006.01)

(52) U.S. Cl. .................................. 719/318; 719/316

(58) Field of Classification Search ................. 719/310, 719/313–316, 318
See application file for complete search history.

(56) References Cited

U.S. PATENT DOCUMENTS

| | | | | |
|---|---|---|---|---|
| 5,628,017 A | * | 5/1997 | Kimmerly et al. | 717/127 |
| 6,023,271 A | * | 2/2000 | Quaeler-Bock et al. | 715/866 |
| 6,549,928 B1 | * | 4/2003 | Mason et al. | 718/102 |
| 6,748,455 B1 | * | 6/2004 | Hinson et al. | 719/318 |

* cited by examiner

*Primary Examiner*—William Thomson
*Assistant Examiner*—George L. Opie
(74) *Attorney, Agent, or Firm*—Simmons, Perrine, Albright & Ellwood, P.L.C.

(57) ABSTRACT

A component model for use in a time sensitive embedded application. The system includes an event-generating software component that can generate an event notification in response to an event. It also includes a listener software component that can receive an event notification. Further, it includes an event transmission object that can facilitate transmission of an event notification from an event-generating software component to a listener software component. The event transmission object passes a primitive data type parameter that conveys data describing an event generated by said event-generating software component to a listener software component.

18 Claims, 6 Drawing Sheets

SOFTWARE COMPONENT MODEL FOR TIME SENSITIVE EMBEDDED APPLICATIONS

CROSS REFERENCE TO RELATED APPLICATION

This application claims the benefit of U.S. Provisional Application No. 60/273,858, filed on Mar. 7, 2001. The content of U.S. Provisional Application 60/273,858, filed on Mar. 7, 2001, including any and all text, tables, drawings and appendices, is hereby incorporated herein in its entirety by this reference.

BACKGROUND OF THE INVENTION

Object-oriented computing languages have been developed and successfully used to develop a wide variety of software applications. One advantage of the object-oriented languages is the increased programming efficiency gained from the ability to reuse and/or modify prior-written code. C++is one example of a well-known object-oriented computing language.

Platform-independent computing languages have been created that, with the aid of an appropriate virtual machine, permit the same application code to be run in conjunction with a variety of different operating systems. Such languages promote efficiency by eliminating the need to develop a separate version of an application for each type of operating system expected to be encountered. JAVA is an example of a platform-independent computing language. JAVA is also an example of an object-oriented language.

Component-based software architectures provide a system that can enhance the reusability advantage gained from object-oriented languages. Component-based software architectures achieve these gains by facilitating the connecting of two or more separate software components to form a new application. JavaBeans is an example of a component-based software architecture. Other types of component-based software architectures include, for example, Microsoft's COM, IBM's OpenDoc and Netscape's Live-Connect.

In the JavaBean architecture, software components ("beans") communicate via "events." A "source" or "event-generating" component fires an event to a "target" or "listener" component. An intermediary object, often referred to as an "adapter," facilitates the transaction. The adapter can be created by a builder tool at design time using a process known as introspection.

The JavaBean component model is well suited for graphical and non-graphical software components for general-purpose computing systems. The JavaBean component model is not suitable, however, for embedded, time-critical or real time systems. Although JavaBean properties may be acceptable for such systems, JavaBean events are not. Accordingly, an event interface for an object-oriented component-based software architecture is needed that is suitable for an embedded, time-critical or real-time system. Further, a technique for multicasting events is needed.

Additionally, recent advances (for example, the JAVA 2 Platform, Micro Edition and the Real-Time Specification for JAVA) have facilitated similar efficiency gains to be achieved with real-time and embedded hardware driver components. Now, what is further needed is an apparatus for associating a hardware interrupt event with a software component event. Currently existing systems, such as C++, JavaBeans, and Microsoft's COM for example, do not meet the "timely delivery" and memory consumption requirements of time-sensitive and embedded applications.

SUMMARY OF THE INVENTION

The present invention involves in part a software component model facilitating time-critical, real time or embedded applications. Also disclosed is a unique multicasting scheme that can notify one or more listener components of an event. Further, the specification discloses a system for interfacing a hardware interrupt-generating component with a software event handling system. It will be appreciated that the various inventions disclosed can be used independently of each other or in combination. dr

DETAILED DESCRIPTION

Figure 1:
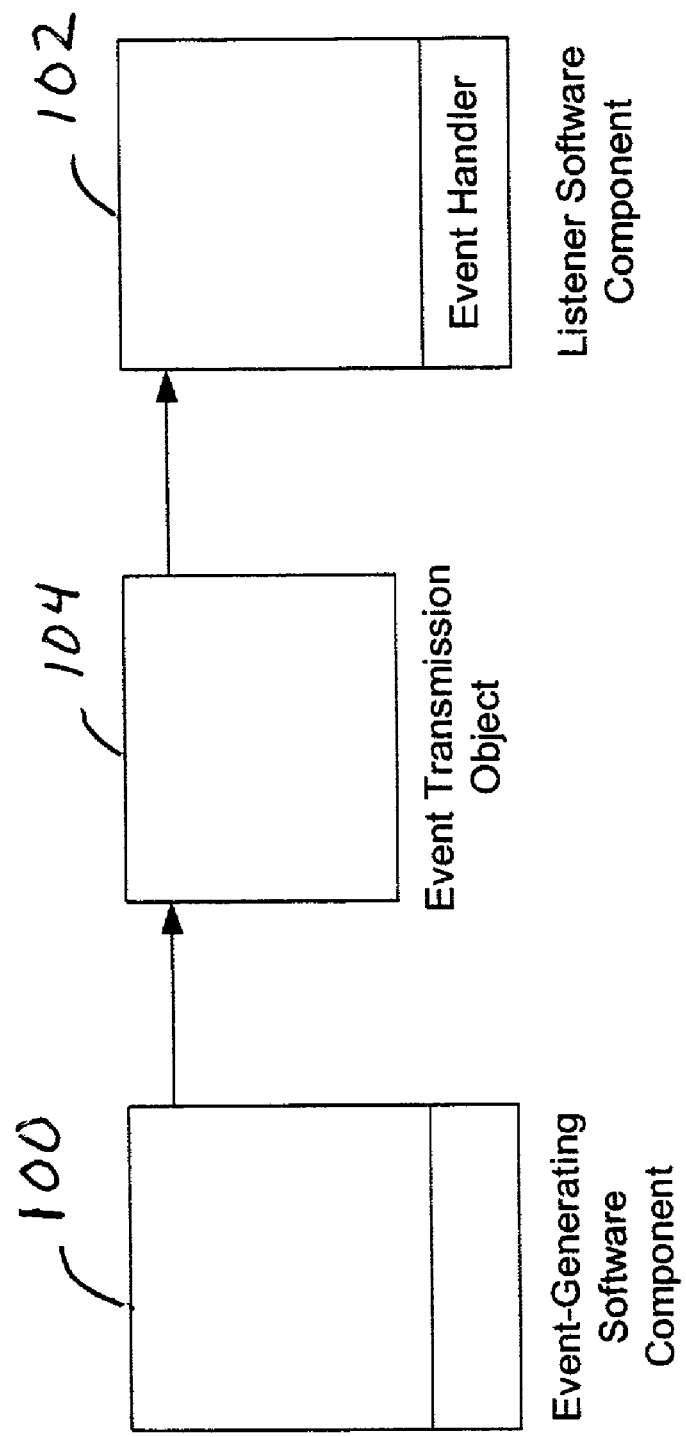
FIG. 1 depicts a component model suitable for use in a time sensitive application.

FIG. 1 depicts a component model suitable for use in a time sensitive application. In FIG. 1, an "event-generating software component"100 can communicate with another software component, here referred to as a "listener software component"102, via an "event transmission object"104. The model described in relation to FIG. 1 and as further described throughout this specification provides a consistent interface between building blocks for, for example, real-time embedded applications.

The event-generating software component 100 and the listener software component 102 can be software objects having properties that can be configured and accessed via setter and getter methods. Such configuration can be accomplished, for example, at design time via use of a development tool. The model also specifies events that can be sent from the event-generating software component 100 to the listener software component 102.

When an event of interest occurs, it is packaged into an event transmission object 104 for delivery to one or more listener software components. A multicast communications system that can be used to communicate events is described in greater detail below. The development tool can examine the event-generating software component 100 and the listener software component 102 and create the appropriate event transmission object 104 to facilitate the communication.

The JavaBean Component Architecture provides an architecture suitable for use with the present invention. The JavaBean Component Architecture provides a means to reuse software, which when combined with tool support, results in an increase in developer productivity. Further, recent advances in the Java 2 Platform, Micro Edition (J2ME) and the release of the Real-Time Specification for JAVA (RTSJ) enable achievement of productivity gains with real-time and embedded hardware device components.

The JavaBean Component Architecture has been used successfully for graphical applications using AWT and Swing components and has been used by third party software vendors to distribute reusable software components using standard packaging. The JavaBean model specifies properties that can configure the characteristics of the JavaBean from inside a development environment at design time. It also specifies events that are sent from the JavaBean to the application when an event of interest occurs. Further, the JavaBean component specification also includes support for "Beaninfo" files, and many development tools provide property editors to configure JavaBeans appropriately for the application under development. The JavaBean component model is well suited for graphical and non-graphical components for general-purpose computing systems. The JavaBeans event model, however, is not well suited for time-critical or embedded systems.

JavaBean properties are "get" and "set" methods that are used to configure the behavior of the component, both at design time by a development tool and at runtime by an application. The extra overhead associated with calling the "get" and "set" methods, however, is minimal compared to the benefits gained. Additionally, such method call overhead is predictable. Consequently, JavaBean properties are acceptable for embedded and real-time applications without modification.

Unmodified JavaBean events, however, are not appropriate for embedded and time-sensitive applications. JavaBean events include a listener interface that includes one or more methods that will be called when an event notification is sent to a listener. An application implements the interface and registers it with the JavaBean, which calls the event methods at the appropriate time. Each of these event methods must also include a parameter of type EventObject. When a component sends an event, it will create a descendent of EventObject, initialize it, and pass it as a parameter to each registered event listener.

Normally, since an event handler could keep a reference to the EventObject for future use, a JavaBean will create a new EventObject each time an event is sent. If the JavaBean reused the same EventObject, the internal state could be changed without the event listener expecting it. Since the creation and discarding of EventObjects is a very expensive operation (the "new( )" operation for the EventObject being time consuming and unpredictable), such an event transmission technique is not appropriate for embedded or time-critical applications. Furthermore, a garbage collection cycle can consequently be initiated at a very undesirable time.

One solution to the above-described problem (the creation of a new EventObject each time an event is sent) is to create one EventObject and reuse it as needed. This solution avoids the overhead associated with the "new( )" operation and it also avoids the possible inopportune initiation of a garbage collection cycle. Such a solution does not, however, strictly adhere to the JavaBean specification. This solution would also allow the development tools to recognize the events and provide full tool support. Overhead does result to some extent, however, since the fields in the EventObject must be initialized with custom state information and the event handler has to access these fields to get the state information.

A second solution is to bypass the use of an EventObject and to instead pass data directly to the event handlers as primitive data types. This type of event can be described as a cracked event or a primitive event. This second solution delivers the maximum speed advantage. Further, some currently available development tools (for example, the Jbuilder tool by Borland) already provide support for cracked or primitive events that conform to the JavaBeans naming convention. Additional development tools may also support such events as the RTSJ becomes more accepted and widespread.

In one embodiment, the cracked events of the second-described solution can be unique for each software component and for each type of event that is sent. These "unique" events have the advantage of being more appropriately named, since each event can be descriptive and specific to one type of event. In another embodiment, the cracked events can be made to be generic and can be reused for more than one software component and for more than one event in the same software component. These "generic" events require fewer class definitions than do the unique events and they are independent of any one component. This reduces the number of inner classes required to interface the software components and also reduces call overhead. Software components utilizing the generic-style of events can often be wired directly together in a pipeline fashion with little or no "glue code" required. Various types of cracked events can be used to implement the second solution described above. One such event can be an event having no parameters. The TriggerEvent of the ajile Real-Time Embedded Component model (aRTEC) provides an example of a cracked event having no parameters. The aRTEC model is a newly available product of the assignee of the present application. Such an event can be sent by an event-generating software component 100 as an indicator that some physical condition has occurred. For example, it can be used to indicate a timeout or to indicate that a sensor-related threshold has been crossed. It can also be received to control some type of physical condition (for example, to set, reset or stop a timer or to activate or deactivate some other component controlling a physical event such as light or sound generation, etc.).

Another type of suitable cracked event is an event that passes a Boolean parameter. The AssertEvent of the above-noted aRTEC model is an example of an event having a single Boolean parameter. Such an event can be sent to indicate a state change. For example, a True value in the parameter can indicate that a given state is active while a False value can indicate that the given state is inactive. (Of course, if desired, True can indicate an inactive state while False is used to indicate an active state.) This type of event can also be sent to control a physical condition. A listener software component 102 receiving the appropriate Boolean event via an event transmission object 104 can proceed to control a physical condition in response to the event. For example, a lamp component could receive a Boolean event, such as the aRTEC AssertEvent that will cause it to turn a lamp on when, for example, a True value is passed and to turn the lamp off when a False value is passed.

A third type of cracked event that can be used to implement the second solution is an event passing a numeric value. The DataEvent of the aRTEC model provides an example of an event having a single integer for its parameter. Such an event can be used when a numeric value is associated with an event. It can be used to indicate or control the degree of change in a physical condition. For example, a light level, sound level, position change, temperature change, rotation change, etc., etc., can be indicated by passing a numeric value as the parameter. By way of a more specific example, a rotation sensor can use such an event, a DataEvent for example, when it detects a rotation of a hardware component. The rotation can be communicated, for example, by passing a value indicating the angle of rotation detected.

It will be appreciated that other types of cracked events can also be used. For example, events having a parameter of type Double, Long, Float, or String can be used. Further, an event characterized as passing a DoubleLong numeric value can be used. Such an event has two parameters, one passing a value of type Double and the other passing a value of type Long. The aRTEC versions of these events are labeled respectively as DoubleEvent, LongEvent, FloatEvent, StringEvent and DoubleLongEvent. The aRTEC model is an extension of the JavaBean Component Architecture. The aRTEC setter and getter methods use the JavaBean naming convention. Further, the aRTEC framework implements a direct extension of java.util.DataEventListener.

Additional detail and description related to specific aRTEC cracked events will now be presented.

The following describes the aRTEC AssertEventListener interface (public interface AssertEventListener): Interface AssertEventListener is an event listener for changes from a mode, state, or object that can become asserted or de-asserted. Method Summary: void assertEvent (boolean active). Informs observers of a mode change, state change, or any other change that can be considered as an object or physical abstraction changing from an asserted state to a non-asserted state or vice-versa. Method Detail: public void assertEvent (Boolean active). Informs observers of a mode change, state change, or any other change that can be considered as an object or physical abstraction changing from an asserted state to a non-asserted state or vice-versa. Parameters: active—whether the mode is asserted or non-asserted.

The following describes the aRTEC DataEventListener interface (public interface DataEventListener): Interface DataEventListener is an event listener for a fundamental int value. Used as an event listener when a dedicated event set is not warranted. Method Summary: void dataEvent (int value). Informs observers of a state change that can be described as an int value. Method Detail: public void dataEvent (int value). Informs observers of a state change that can be described as an int value. Parameters: value—the new data when a change occurs.

The following describes the aRTEC DoubleEventListener interface (public interface DoubleEventListener): Interface DoubleEventListener is an event listener for a fundamental double value. Used as an event listener when a dedicated event set is not warranted. Method Summary: void doubleEvent (double Value). Informs observers of a state change that can be described as a double value. Method Detail: public void doubleEvent (double Value). Informs observers of a state change that can be described as a double value. Parameters: Value—the new data when a change occurs.

The following describes the aRTEC DoubleLongEventListener interface (public interface DoubleLongEventListener): Interface DoubleLongEventListener is an event listener for a compound double and long value. Used as an event listener when a dedicated event set is not warranted. Method Summary: void doubleLongEvent (double doubleValue, long longValue). Informs observers of a state change that can be described as a combined double and long value. Method Detail: public void doubleLongEvent (double doubleValue, long longValue). Informs observers of a state change that can be described as a combined double and long value. Parameters: doubleValue—the new data when a change occurs, longValue—a long value associated with the double value.

The following describes the aRTEC FloatEventListener interface (public interface FloatEventListener): Interface FloatEven Listener is an event listener for a fundamental float value. Used as an event listener when a dedicated event set is not warranted. Method Summary: void floatEvent (float value). Informs observers of a state change that can be described as a float value. Method Detail: public void floatEvent (float value). Informs observers of a state change that can be described as a float value. Parameters: value—the new data when a change occurs.

The following describes the aRTEC LongEventListener interface (public interface LongEventListener): Interface LongEventListener is an event listener for a fundamental long value. Used as an event listener when a dedicated event set is not warranted. Method Summary: void longEvent (long value). Informs observers of a state change that can be described as a long value. Method Detail: public void longEvent (long value). Informs observers of a state change that can be described as a long value. Parameters: value—the new data when a change occurs.

The following describes the aRTEC StringEventListener interface (public interface StringEventListener): Interface StringEventListener is an event listener for a String value. Used as an event listener when a dedicated event set is not warranted. Method Summary: void stringEvent (java. lang. String value). Informs observers of new data that can be described as a String. Method Detail: public void stringEvent (java.lang.String value). Informs observers of new data that can be described as a String. Parameters: value—the new data.

The following describes the aRTEC TriggerEventListener interface (public interface TriggerEventListener): Interface TriggerEventListener is an event listener for an action without associated data. Used as an event listener when a dedicated event set is not warranted. Method Summary: void triggerEvent ( ). Informs observers of an action that can be described without data. Method Detail: public void triggerEvent( ). Informs observers of an action that can be described without data.

The following information provides further detail and description of the various aRTEC specific components that can generate and receive the cracked events.

The following describes the aRTEC AssertToTrigger component (public class AssertToTrigger; extends java.lang.Object; implements AssertEventListener), a component that converts an AssertEvent to one of two trigger events. One trigger event is fired for AssertEvents (true) and another is fired for AssertEvent (false).

Constructor Summary Related to AssertToTrigger Class: AssertToTrigger ( ).

Method Summary Related to AssertToTrigger Class: void addNegativeListener (TriggerEventListener listener)—registers a TriggerEventListener to be notified when an assert with a negative value is received.

void addPositiveListener (TriggerEventListener listener)—registers a TriggerEventListener to be notified when an assert with a positive value is received.

void assertEvent (boolean value)—assert input event.

void removeNegativeListener (TriggerEventListener listener)—unregisters a triggerEventListener so it will no longer receive an event when a negative assert is received.

void removePositiveListener (TriggerEventListener listener)—unregisters a triggerEventListener so it will no longer receive an event when a positive assert is received.

Methods inherited from class java.lang.Object: equals, getClass, hashCode, notify, notifyAll, toString, wait.

Constructor Detail Related to AssertToTrigger Class: public AssertToTrigger( ).

Method Detail Related to AssertToTrigger Class for assertEvent: public void assertEvent (boolean value). Specified by: assertEvent in interface AssertEventListener. Parameters: active indicates whether the mode is asserted or non-asserted.

Method Detail Related to AssertToTrigger Class for addPositiveListener: public void addPositiveListener (TriggerEventListener listener). Registers a TriggerEventListener to be notified when an assert with a positive value is received. Parameters: listener—the receiver of the triggerEvent.

Method Detail Related to AssertToTrigger Class for removePositiveListener: public void removePositiveListener (TriggerEventListener listener). Unregisters a triggerEventListener so it will no longer receive an event when a positive assert is received. Parameters: listener—the listener that will no longer receive events.

Method Detail Related to AssertToTrigger Class for addNegativeListener: public void addNegativeListener (TriggerEventListener listener). Registers a TriggerEventListener to be notified when an assert with a negative value is received. Parameters: listener—the receiver of the triggerEvent.

Method Detail Related to AssertToTrigger Class for removeNegativeListener: public void removeNegativeListener (TriggerEventListener listener). Unregisters a triggerEventListener so it will no longer receive an event when a negative assert is received. Parameters: listener—the listener that will no longer receive events.

The following describes the aRTEC CallbackTimer component (public class CallbackTimer; extends java.lang.Object; implements java.lang.Runnable).

Constructor Summary Related to CallbackTimer Class: CallbackTimer ( )—creates and starts a new callback timer with a default thread priority of one greater than the calling thread.

Method Summary Related to CallbackTimer Class: void callback (long timeMillis, TriggerEventListener listener)—registers a method to be called back at a specific time.

static CallbackTimer getinstance ( )—returns a common callback timer that can be shared between users.

int getThreadPriority ( )—returns the priority of the thread that this callback timer is using.

boolean removeAndCallback (long timeMillis, TriggerEventListener listener)—registers a listener for a callback at a specific time and removes any pending callbacks in the queue.

boolean removeCallback (TriggerEventListener listener)—removes all entries for a given listener.

void run ( )—internal use only.

void setThreadPriority (int value)—sets the priority of the thread that sends events from this callback timer.

Methods inherited from class java.lang.Object: equals, getclass, hashcode, notify, notifyAll, tostring, wait.

Constructor Detail Related to CallbackTimer Class: public CallbackTimer ( ). Creates and starts a new callback timer with a default thread priority of one greater than the calling thread. A system callback timer can be created and reused by calling getinstance ( ) instead of creating a dedicated callback timer using this method.

Method Detail Related to CallbackTimer Class for getThreadPriority: public int getThreadPriority ( ). Return the priority of the thread that this callback timer is using. Returns: the thread priority of this callback timer.

Method Detail Related to CallbackTimer Class for setThreadPriority: public void setThreadPriority (int value). Sets the priority of the thread that sends events from this callback timer. Parameters: value—the new thread priority level.

Method Detail Related to CallbackTimer Class for getinstance: public static CallbackTimer getInstance ( ). Returns a common callback timer that can be shared between users.

Method Detail Related to CallbackTimer Class for callback: public void callback (long timeMillis, TriggerEventListener listener). Registers a method to be called back at a specific time. A TriggerEvent will be sent to the specified listener at the specified time. If the same listener is already registered to receive a callback from this class, both callbacks will be honored. Parameters: timeMillis—the absolute time the callback will occur, listener—the object to receive a trigger event.

Method Detail Related to CallbackTimer Class for removeCallback: public boolean removeCallback (TriggerEventListener listener). Removes all entries for a given listener. This listener will not receive any callbacks already in the queue. Return true if at least one queued callback entry was removed.

Method Detail Related to CallbackTimer Class for removeAndCallback: public boolean removeAndCallback (long timeMillis, TriggerEventListener listener). Registers a listener for a callback at a specific time and removes any pending callbacks in the queue. This first removes any queue entries with the same listener, then registers it for a new callback at the specified absolute time. Parameters: timeMillis—the absolute time the callback will occur, listener—the object to receive a trigger event. Returns: true if at least one queued callback entry was removed.

Method Detail Related to CallbackTimer Class for run: public void run ( ). Internal use only. This class implements the runnable interface and has a dedicated thread. Specified by: run in interface java.lang.Runnable.

The following describes the aRTEC Counter component (public class Counter; extends java.lang.Object; implements TriggerEventListener, AssertEventListener, DataEventListener), a component that provides an integer up/down counter. This class is a counter that will count up or down to a specified rollover value. It then rolls back and continues counting, or stops counting based on the Reload property. The class will send trigger events when a reload condition occurs, and send data events when the count changes.

The counter can count up or down dependent on the countUp property. When counting up, counting will continue until the reload value-1 is reached. On the next count, a trigger event is thrown and the counter reloads to 0. If the counter is configured to not reload, the timer will not be reset back to 0, but the trigger event will still be sent. The trigger event is latched internally so it will only be sent once, until the count does change.

When counting down, counting will continue until 0 is reached. On the next count, a trigger event is thrown, and the counter reloads to 1 minus the reload value. If the counter is configured to no reload, the count will stay at 0, but the trigger event will still be sent. The trigger event is latched internally so it will only be sent once, until the count does change.

This class can receive a trigger event. This will cause the counter to be incremented or decremented based on the countUp property. Further, this class can receive an assert event that will enable or disable the counter. If the received boolean value is true, the counter will be enabled. If it is false, the counter will be disabled. This class can also receive a date event that will force the count to a specific value.

Constructor Summary Related to the Counter Class: Counter ( ).

Method Summary Related to the Counter Class: void addCountListener (DataEventListener listener)—registers a DataEventListener to receive an event containing the new count data when the count changes.

void addRolloverListener (TriggerEventListener listener)—registers a TriggerEventListener to receive a stateless event when the timer overflows.

void assertEvent (boolean value)—receives an assertEvent that will enable or disable the counter.

void count ( )—causes the counter to count if it is enabled.

void dataEvent (int value)—receives a dataEvent that will set the current count.

int getCount ( )—return the current count.

int getReloadCount ( )—returns the reload value of the counter.

TriggerEventListener getResetListener ( )—returns a triggerEventListener that will cause the counter to reset to 0 if counting up and to reloadValue−1 if counting down.

boolean isCountup ( )—returns if the counter is counting up or down.

boolean isEnabled ( )—returns the enabled state of the counter.

boolean isReload ( )—returns the reload property of the counter.

void removeCountListener (DataEventListener listener)—unregisters a DataEventListener so it will no longer receive an event when the count changes.

void removeRolloverListener (TriggerEventListener listener)—unregisters a triggerEventListener so it will no longer receive an event on rollover.

void reset ( )—resets the counter value.

void setCount (int value)—sets the current count.

void setCountUp (boolean value)—sets if the counter is counting up or down.

void setEnabled (boolean value)—sets the enabled state of the counter.

void setReload (boolean value)—sets if the counter will reload after the count reaches 0 if counting down or reload−1 if counting up.

void setReloadCount (int value)—sets the reload value of the counter.

void triggerEvent ( )—receives a triggerEvent that will cause the counter to increment or decrement if enabled.

Methods inherited from class java.lang.Object: equals, getclass, hashCode, notify, notifyAll, toString, wait.

Constructor Detail Related to the Counter Class: public Counter ( ).

Method Detail Related to the Counter Class for isEnabled: public boolean isEnabled ( ). Returns the enabled state of the counter. When the counter is not enabled, input triggerEvents are ignored.

Method Detail Related to the Counter Class for setEnabled: public void setEnabled (boolean value). Sets the enabled state of the counter. When the counter is not enabled, triggerEvents are ignored.

Method Detail Related to the Counter Class for isCountUp: public boolean isCountUp ( ). Returns if the counter is counting up or down.

Method Detail Related to the Counter Class for setCountUp: public void setCountUp (boolean value). Sets if the counter is counting up or down.

Method Detail Related to the Counter Class for isReload: public boolean isReload ( ). Returns the reload property of the counter. When reload is true, the counter will reset back to 1-reloadvalue, or 0 depending on whether the counter is counting up or down. If the reload is false, the timer will stop at 0 when counting down or at reload−1 value when counting up.

Method Detail Related to the Counter Class for setReload: public void setReload (boolean value). Sets if the counter will reload after the count reaches 0 if counting down or reload−1 if counting up.

Method Detail Related to the Counter Class for getReloadCount: public int getReloadCount ( ). Returns the reload value of the counter. The counter will count up to 1-the reload count, or down to 0 and reload with 1-the reload value.

Method Detail Related to the Counter Class for setReloadCount: public void setReloadCount (int value). Sets the reload value of the counter. The counter will count up to the reload count-1, or down to 0 and reload with 1-the reload value.

Method Detail Related to the Counter Class for getCount: public int getCount ( ). Return the current count.

Method Detail Related to the Counter Class for setCount: public void setCount (int value). Sets the current count.

Method Detail Related to the Counter Class for count: public void count ( ). Causes the counter to count if it is enabled. The counter will count up or down based on the countup property.

Method Detail Related to the Counter Class for reset: public void reset ( ). Resets the counter value. The count value will be set to 0 if it is counting up, or the reload value minus 1 if counting down.

Method Detail Related to the Counter Class for addRolloverListener: public void addRolloverListener (TriggerEventListener listener). Registers a TriggerEventListener to receive a stateless event when the timer overflows. If counting up, the event will be sent when the counter rolls back to zero. If counting down, the event will be sent when the counter reloads with the reload value. Parameters: listener—the receiver of the triggerEvent.

Method Detail Related to the Counter Class for removeRolloverListener: public removeRolloverListener (TriggerEventListener listener). Unregisters a triggerEventListener so it will no longer receive an event on rollover. Parameters: listener—the listener that will no longer receive events.

Method Detail Related to the Counter Class for addCountListener: public void addCountListener (DataEventListener listener). Registers a DataEventListener to receive an event containing the new count data when the count changes. Parameters: listener—the receiver of the dataEvent.

Method Detail Related to the Counter Class for removeCountListener: public void removeCountListener (DataEventListener listener). Unregisters a DataEventListener so it will no longer receive an event when the count changes. Parameters: listener—the listener that will no longer receive events.

Method Detail Related to the Counter Class for assertEvent: public void (boolean value). Receives an assertEvent that will enable or disable the counter. Specified by: assertEvent in interface AssertEventListener. Parameters: active—whether the mode is asserted or non-asserted.

Method Detail Related to the Counter Class for triggerEvent: public void triggerEvent ( ). Receives a triggerEvent that will cause the counter to increment or decrement if enabled. Specified by: triggerEvent in interface TriggerEventListener.

Method Detail Related to the Counter Class for dataEvent: public void dataEvent (int value). Receives a dataEvent that will set the current count. This is functionally identical to calling the setcount Method. Specified by: dataEvent in interface DataEventListener. Parameters: value—the count that will be loaded.

Method Detail Related to the Counter Class for getResetListener: public TriggerEventListener getResetListener ( ). Returns a triggerEventListener that will the counter to reset to 0 if counting up and to reloadValue-1 if counting down.

The following describes the aRTEC DataLookup component (public class DataLookup; extends java.lang.Object; implements DataEventListener), a component that converts a data event to another data event. The received data event is used as an index into a table of constants to determine the sent value. If the input value is not in range, an output data event is not sent.

Constructor Summary Related to the DataLookup Class: DataLookup ( ).

Method Summary Related to the DataLookup Class: void addDataListener (DataEventListener listener)—registers a DataEventListener to be notified when a data event is received.

void dataEvent (int value)—looks up data in the table based on the passed index.

int [] getLookupTable ( )—returns the data lookup table.

void removeDataListener (DataEventListener listener)—unregisters an DataEventListener so it will no longer receive events.

void setLookupTable (int [] table)—sets the data lookup table.

Methods inherited from class java.lang.Object: equals, getclass, hashcode, notify, notifyAll, tostring, wait.

Constructor Detail Related to the DataLookup Class: public DataLookup ( ).

Method Detail Related to the DataLookup Class for getLookupTable: public int [] getLookupTable ( ). Returns the data lookup table.

Method Detail Related to the DataLookup Class for setLookupTable: public void setLookupTable (int [] table). Sets the data lookup table.

Method Detail Related to the DataLookup Class for dataEvent: public void dataEvent (int value). Looks up data in the table based on the passed index. The result is resent in another data event. Specified by: dataEvent in interface DataEventListener. Parameters: value—the new data when a change occurs.

Method Detail Related to the DataLookup Class for addDataListener: public void addDataListener (DataEventListener listener). Registers an DataEventListener to be notified when a data event is received. The data parameter will date from the data table. Parameters: listener—the receiver of the DataEvent.

Method Detail Related to the DataLookup Class for removeDataListener: public void removeDataListener (DataEventListener listener). Unregisters a DataEventListener so it will no longer receive events. Parameters: listener identifies the listener that will no longer receive events.

The following describes the aRTEC OneShotTimer component (public class OneShotTimer; extends java.lang.Object: implements TriggerEventListener), a one shot timer component that sends events after a preset time period. The component can be started and stopped by methods or by receiving events. When the preset time interval expires, a trigger event is sent to indicate that the time has elapsed and the timer waits to be started again. If the timer has been started but has not yet expired, it is considered to be running. If the timer is restarted while it is running, the timer starts over, effectively extending the time delay.

When the one shot is started, it sends an assertEvent with true as the value to indicate that it is running. When the time expires, it sends an assertEvent with false as the parameter to indicate that the timer is no longer running. At that time, a triggerEvent is also sent.

The one shot timer can receive one triggerEvent to start the timer and one triggerEvent to stop the timer. A trigger event sent to this object will start the timer. Because this class can only implement the triggerEventListener once, an inner class is used to provide a triggerEventListener listener that will stop the timer when a trigger event is received.

Constructor Summary Related to the OneShotTimer Class: OneShotTimer ( ). Creates a lightweight one shot timer component.

Method Summary Related to the OneShotTimer Class: void addRunningListener (AssertEventListener listener)—registers an AssertEventListener to be notified true when the one shot starts and notified false when the one shot completes.

void addTimerListener (TriggerEventListener listener)—registers a TriggerEventListener to receive a stateless event when the one shot time expires.

int getIntervalMillis ( )—returns the time interval of the timer in milliseconds.

TriggerEventListener getStopListener ( )—returns a TriggerEventListener that will stop the one shot.

void removeRunningListener (AssertEventListener listener)—unregisters an AssertEventListener so it will no longer receive events.

void removeTimerListener (TriggerEventListener listener)—unregisters a triggerEventListener so it will no longer receive an event on timeout.

void setIntervalMillis (int value)—sets the time interval of the timer in milliseconds.

void start ( )—starts the one shot timer.

void stop ( )—stops the timer.

void triggerEvent ( )—receives a trigger event that will start the timer.

Methods inherited from class java.lang.Object: equals, getclass, hashCode, notify, notifyAll, toString, wait.

Constructor Detail Related to the OneShotTimer Class: public OneShotTimer ( ). Creates a lightweight one shot timer component.

Method Detail Related to the OneShotTimer Class for getIntervalMillis: public int getIntervalMillis ( ). Returns the time interval of the timer in milliseconds. The time interval can be extended by restarting the timer by calling the start method or sending it a triggerEvent. Returns: the time that the one shot will run in milliseconds.

Method Detail Related to the OneShotTimer Class for setIntervalMillis: public void setIntervalMillis (int value). Sets the time interval of the timer in milliseconds. The time interval can be extended by restarting the timer by calling the start method or sending it a triggerEvent. If the timer is currently running, it will not be affected until it is restarted. Parameters: value—the time that the one shot will run in milliseconds.

Method Detail Related to the OneShotTimer Class for start: public void start ( ). Starts the one shot timer. If the timer is already running, then the time interval is extended so it will expire at the current time +the interval time.

Method Detail Related to the OneShotTimer Class for stop: public void stop ( ). Stops the timer. In order to start it again, the timer must be reset by calling start.

Method Detail Related to the OneShotTimer Class for addTimerListener: public void addTimerListener (TriggerEventListener listener). Registers a TriggerEventListener to receive a stateless event when the one shot time expires. Parameters: listener—the receiver of the triggerEvent.

Method Detail Related to the OneShotTimer Class for removeTimerListener: public void removeTimerListener (TriggerEventListener listener). Unregisters a triggerEventListener so it will no longer receive an event on timeout. Parameters: listener—the listener that will no longer receive events.

Method Detail Related to the OneShotTimer Class for addRunningListener: public void addRunningListener (AssertEventListener listener). Registers an AssertEventListener to be notified true when the one shot starts and notified false when the one shot completes. Parameters: listener—the receiver of the assertEvent.

Method Detail Related to the OneShotTimer Class for removeRunningListener: public void removeRunningListener (AssertEventListener listener). Unregisters an AssertEventListener so it will no longer receive events. Parameters: listener—the listener that will no longer receive events.

Method Detail Related to the OneShotTimer Class for triggerEvent: public void triggerEvent ( ). Receives a trigger event that will start the timer. This method is functionally identical to start ( ). Specified by: triggerEvent in interface TriggerEventListener.

Method Detail Related to the OneShotTimer Class for getStopListener: public TriggerEventListener getStopListener ( ). Returns a TriggerEventListener that will stop the one shot. In order to start it again, it must be restarted which will reset the time interval. The OneShotTimer component can receive two unique trigger events to start or stop the timer. Because a triggerEventListener is an interface, the PeriodicTimer component can only directly receive one triggerEvent. This default trigger event will start the timer. An innerclass that implements the triggerEventListener interface is used to stop the timer. You can get a reference to this inner classes and register it as an event listener. This method returns a reference to the inner class that will stop the timer. Returns: a reference to a triggerEventListener that will stop the timer.

The following describes the aRTEC PeriodicTimer component (public class PeriodicTimer; extends java.lang.Object; implements AssertEventListener, TriggerEventListener, java.lang.Runnable), a clock component that generates a periodic stream of trigger events. This component can use a standard java thread, or a real-time periodic thread to generate events at a periodic rate. Its period and priority can be set. A TriggerEventListener can register to receive trigger events at a periodic rate. The component can be disabled which will not stop the timer but will prevent events from being thrown.

The periodic timer can receive an Assert event that will enable or disable the timer. It can also receive trigger events to start or stop the timer. A trigger event sent to this object will start the timer. Because this class can only implement the triggerEventListener once, an inner class is used to provide a triggerEventListener listener that will stop the PeriodicTimer when a trigger event is received.

Constructor Summary Related to the PeriodicTimer Class: PeriodicTimer ( ).

Method Summary Related to the PeriodicTimer Class: void addPeriodicListener (TriggerEventListener listener)—registers a TriggerEventListener to receive a stateless event on a periodic basis.

void assertEvent (boolean value)—enables or disables the timer.

int getIntervalMillis ( )—returns the period in milliseconds.

TriggerEventListener getStopListener ( )—returns a TriggerEventListener that will stop the timer when an event is received.

int getThreadPriority ( )—sets the priority of the thread that generates trigger events.

boolean isEnabled ( )—returns if the PeriodicTimer will throw events.

void removePeriodicListener (TriggerEventListener listener)—unregisters a triggerEventListener so it will no longer receive an event on a periodic basis.

void run ( )—internal use only.

void setEnabled (boolean value)—enables or disables the PeriodicTimer to throw events.

void setIntervalMillis (int value)—sets the period in milliseconds.

void setThreadPriority (int value)—returns the priority of the thread that generates trigger events.

void start ( ) starts the periodic timer.

void stop ( )—stops the timer.

void triggerEvent ( )—starts the timer.

Methods inherited from class java.lang.Object: equals, getclass, hashcode, notify, notifyAll, toString, wait.

Constructor Detail Related to the PeriodicTimer Class: public PeriodicTimer ( ).

Method Detail Related to the PeriodicTimer Class for getIntervalMillis: public int getIntervalMillis ( ). Returns the period in milliseconds. The period of this component can be configured. The period will be exact, meaning it will not slide based on event listeners processing time. Returns: the current time between events in milliseconds.

Method Detail Related to the PeriodicTimer Class for setIntervalMillis: public void setIntervalMillis (int value). Sets the period in milliseconds. Note: the change may not be reflected until the old period expires. The period of this component can be configured. The period will be exact, meaning it will not slide based on event listeners processing time. Parameters: value—the new period in milliseconds.

Method Detail Related to the PeriodicTimer Class for getThreadPriority: public int getThreadPriority ( ). Sets the priority of the thread that generates trigger events.

Method Detail Related to the PeriodicTimer Class for setThreadPriority: public void setThreadPriority (int value). Returns the priority of the thread that generates trigger events.

Method Detail Related to the PeriodicTimer Class for isEnabled: public boolean isEnabled ( ). Returns if the PeriodicTimer will throw events. The PeriodicTimer can be enabled or disabled. This does not change or delay the processing of events. The internal clock still runs, but events will not be thrown.

Method Detail Related to the PeriodicTimer Class for setEnabled: public void setEnabled (boolean value). Enables or disables the PeriodicTimer to throw events. The PeriodicTimer can be enabled or disabled. This does not change or delay the processing of events. The internal clock still runs, but events will not be thrown.

Method Detail Related to the PeriodicTimer Class for start: public void start ( ). Starts the periodic timer. If the timer was previously stopped, the next trigger time will be now+the period. If the timer has already been started, this method has no affect.

Method Detail Related to the PeriodicTimer Class for stop: public void stop ( ). stops the timer. The time is stopped and no further events will be thrown until the timer has been started.

Method Detail Related to the PeriodicTimer Class for run: public void run ( ). Internal use only. This method is required to implement the runnable interface. Specified by: run in interface java.lang.Runnable.

Method Detail Related to the PeriodicTimer Class for addPeriodicListener: public void addPeriodicListener (TriggerEventListener listener). Registers a TriggerEventListener to receive a stateless event on a periodic basis. Parameters: listener—the receiver of the AssertEvent.

Method Detail Related to the PeriodicTimer Class for removePeriodicListener: public void removePeriodicListener (TriggerEventListener listener). Unregisters a triggerEventListener so it will no longer receive an event on a periodic basis. Parameters: listener—the listener that will no longer receive events.

Method Detail Related to the PeriodicTimer Class for assertEvent: public void assertEvent (boolean value). Enables or disables the timer. Note that the clock does not stop based on the enabled status, but trigger events will not be thrown. Specified by: assertEvent in interface AssertEventListener. Parameters: active—whether the mode is asserted or non-asserted.

Method Detail Related to the PeriodicTimer Class for triggerEvent: public void triggerEvent ( ). Starts the timer. This class can receive generic trigger events. Specified by: triggerEvent in interface TriggerEventListener.

Method Detail Related to the PeriodicTimer Class for getStopListener: public TriggerEventListener getStopListener ( ). Returns a TriggerEventListener that will stop the timer when an event is received.

The PeriodicTimer component can receive two unique trigger events to start or stop the timer. Because a triggerEventListener is an interface, the PeriodicTimer component can only directly receive one triggerEvent. This default trigger event will start the timer. An innerclass that implement the triggerEventListener interface is used to stop the timer. You can get a reference to this inner class and register it as an event listener. This method returns a reference to the inner class that will stop the timer. Returns: a reference to a triggerEventListener that will stop the timer.

The following describes the aRTEC PushButton component (public class PushButton; extends java.lang.Object; implements TriggerEventListener), a component that controls and debounces a pushbutton switch wired to a GPIO pin. This class is similar in functionality to a GpioPin but it additionally includes pin debouncing. A debounceTime is specified. The pin must be in a stable state for this period of time before the change is registered in this class.

Like the GpioPin class, this class can send a triggerEvent when the state rises, falls, or both. Unlike the GpioPin, this class will send an assertEvent whenever the state changes with the state reflected in the passed value. So the report policy will only affect the triggerEvent and not the assertEvent in this class.

Field Summary Related to the PushButton Class: static int TRIGGER OFF—causes the pushbutton to no longer generate any trigger events.

static int TRIGGER ON_PUSH—causes the pushbutton to send a trigger event only when the button is pushed.

static int TRIGGER ON PUSH AND RELEASE—causes the pushButton to send a trigger event when the button is pressed or when it is released.

static int TRIGGER ON RELEASE—causes the pushButton to send a trigger event only when the button is released.

Constructor Summary Related to the PushButton Class: PushButton ( )—creates an instance of a PushButton that has control over one GpioPin on an ajile Systems aJ-100 microcontroller. The pin ID property must be set at a later time before the PushButton can be used.

PushButton (int pinID)—creates an instance of an object that controls one IO pin.

Method Summary Related to the PushButton Class: void addStateListener (AssertEventListener listener)—registers an AssertEventListener to receive an event when any state change occurs and has stabilized.

void addTriggerListener (TriggerEventListener listener)—registers a TriggerEventListener to receive a stateless event when a pin has changed states and stabilized.

int getDebounceTime ( )—returns the time a button must be stable before events will be generated.

int getPinID ( )—returns current Pin ID that identifies which processor bit is used.

int getTriggerReportPolicy ( )—returns the condition for sending triggerEvents to report a button press or release.

boolean isPinInverted ( )—each pin can be a positive or negative assertion logic.

boolean isPressed ( )—returns the current debounced state of the pin.

void removeStateReportListener (AssertEventListener listener)—unregisters an assertEventListener so it will no longer receive an event when a pin state change occurs.

void removeTriggerListener (TriggerEventListener listener)—unregisters a triggerEventListener so it will no longer receive an event when a pin state change occurs.

void setDebounceTime (int millis)—sets the time in milliseconds that a button must be stable before interrupts will be generated.

void setPinID (int pinID)—sets the processor bit that will be controlled by this GpioPin object.

void setPinInverted (boolean value)—each pin can be a positive or negative assertion logic.

void setTriggerReportPolicy (int value)—sets the condition for sending triggerEvents to report a button Press or release. It will not affect assertEvents which will always be sent regardless of the triggerReportPolicy.

void triggerEvent ( )—internal use only method to receive events from the underlying GpioPin.

Methods inherited from class java.lang.Object: equals, getClass, hashCode, notify, notifyAll, toString, wait.

Field Detail Related to the PushButton Class for TRIGGER_OFF: public static final TRIGGER_OFF. Causes the pushButton to no longer generate any trigger events.

Field Detail Related to the PushButton Class for TRIGGER_ON_PUSH: public static final int TRIGGER_ON_PUSH. Causes the pushButton to send a trigger event only when the button is pushed.

Field Detail Related to the PushButton Class for TRIGGER_ON_RELEASE: public static final int TRIGGER_ON_RELEASE. Causes the pushButton to send a trigger event only when the button is released.

Field Detail Related to the PushButton Class for TRIGGER_ON_PUSH_AND_RELEASE: public static final int TRIGGER_ON_PUSH_AND_RELEASE. Causes the pushButton to send a trigger event when the button is pressed or when it is released.

Constructor Detail Related to the PushButton Class for PushButton: public PushButton ( ). Creates an instance of a PushButton that has control over one GpioPin on the microcontroller. The pin ID property must be set at a later time before the PushButton can be used.

Constructor Detail Related to the PushButton Class for PushButton: public PushButton (int pinID). Creates an instance of an object that controls one IO pin of the microcontroller. Possible GPIO pin identifiers include GpioPin.GPIOA_BITX where 0<=X<=7; GpioPin.GPIOB_BITX where 0<=X<=7; GpioPin.GPIOC_BITX where 0<=X<=7; GpioPin.GPIOD_BITX where 0<=X<=7; and GpioPin.GPIOE_BITX where 0<=X <=7. Parameters: pinID—the pin identifier.

Method Detail Related to the PushButton Class for getPinID: public int getPinID ( ). Returns current Pin ID that identifies which microcontroller bit is used.

Method Detail Related to the PushButton Class for setPinID: public void setPinID (int pinID). Sets the microcontroller bit that will be controlled by this GpioPin object Method Detail Related to the PushButton Class for isPressed: public boolean isPressed ( ). Returns the current debounced state of the pin. This does not reflect the state of the pin, but rather the state after debouncing. Returns: true if the pin is pushed, false if the pin is not pushed.

Method Detail Related to the PushButton Class for isPinInverted: public boolean isPinInverted ( ). Each pin can be a positive or negative assertion logic. A non-inverted pin will be pushed when the pin is grounded. An inverted pin will be released when the pin is grounded. Returns: true if the pin is inverting its logic level.

Method Detail Related to the PushButton Class for setPinInverted: public void isPinInverted (boolean value). Each pin can be a positive or negative assertion logic. An inverted pin will return false for the state on a high level and true for a low level. Note: this property affects the PinState property. It does not affect the Report Policy used to determine when the event is thrown. Parameters: value—true if the pin is inverting its logic level.

Method Detail Related to the PushButton Class for getDebounceTime: public int getDebounceTime ( ). Returns the time a button must be stable before events will be generated.

Method Detail Related to the PushButton Class for setDebounceTime: public void setDebounceTime (int millis). Sets the time in milliseconds that a button must be stable before interrupts will be generated. This time period will be used to debounce the switch.

Method Detail Related to the PushButton Class for getTriggerReportPolicy: public int getTriggerReportPolicy ( ). Returns the condition for sending triggerEvents to report a button Press or release. An event can be generated based on pin state changes. The ReportPolicy determines when the event is generated. User code can sign up to receive the event by the addReportListener( ) registration method. This will affect trigger events, it will not affect assert events. The following report policies can be returned: PushButton.TRIGGER_OFF, PushButton.TRIGGER_ON_PUSH, PushButton.TRIGGER_ON_RELEASE, PushButton.TRIGGER_ON_PUSH_AND_RELEASE. Returns: the report policy currently in place for trigger events.

Method Detail Related to the PushButton Class for setTriggerReportPolicy: public void setTriggerReportPolicy (int value). Sets the condition for sending triggerEvents to report a button Press or release. It will not affect assertEvents which will always be sent regardless of the triggerReportPolicy. An event can be generated based on pin state changes. The ReportPolicy determines when the event is generated. User code can sign up to receive the event by the addReportListener( ) registration method. This will affect trigger events, it will not affect assert events. The following report policies can be returned: PushButton.TRIGGER_OFF, PushButton.TRIGGER_ON_PUSH, PushButton.TRIGGER_ON_RELEASE, and PushButton.TRIGGER_ON_PUSH_AND_RELEASE. Parameters: value—the condition to generate trigger events.

Method Detail Related to the PushButton Class for addTriggerListener: public void addTriggerListener (TriggerEventListener listener). Registers a TriggerEventListener to receive a stateless event when a pin has changed states and stabilized. Events will be generated according the TriggerReportPolicy currently in place. Parameters: listener—the receiver of the TriggerEvent.

Method Detail Related to the PushButton Class for removeTriggerListener: public void removeTriggerListener (TriggerEventListener listener). Unregisters a triggerEventListener so it will no longer receive an event when a pin state change occurs. Parameters: listener—the listener that will no longer receive events.

Method Detail Related to the PushButton Class for addStateListener: public void addStateListener (AssertEventListener listener). Registers an AssertEventListener to receive an event when any state change occurs and has stabilized. Parameters: listener—the receiver of the AssertEvent.

Method Detail Related to the PushButton Class for removeStateReportListener: public void removeStateReportListener (AssertEventListener listener). Unregisters an assertEventListener so it will no longer receive an event when a pin state change occurs. Parameters: listener—the listener that will no longer receive events.

Method Detail Related to the PushButton Class for triggerEvent: public void triggerEvent ( ). Internal use only method to receive events from the underlying GpioPin. Specified by: triggerEvent in interface TriggerEventListener.

The following describes the aRTEC Switch component (public class Switch; extends java.lang.Object; implements AssertEventListener, TriggerEventListener), a component that receives trigger events and relays them on to one of two trigger listeners The listener to receive the trigger event is determined by the state of the switch. The state of the switch can be set through properties or by receiving an Assert event. The switch state is ether true or false.

Constructor Summary Related to the Switch Class: Switch ( ).

Method Summary Related to the Switch Class: void addFalseListener (TriggerEventListener listener)—registers a TriggerEventListener to be notified when an input trigger is received and the switch is in the false state.

void addTrueListener (TriggerEventListener listener)—registers a TriggerEventListener to be notified when an input trigger is received and the switch is in the true state.

void assertEvent (boolean value)—receives an Assert event that will set the switch state.

boolean getState ( )—returns the switch state.

void removeFalseListener (TriggerEventListener listener)—unregisters a triggerEventListener so it will no longer receive an event.

void removeTrueListener (TriggerEventListener listener)—unregisters a triggerEventListener so it will no longer receive an event.

void setState (boolean value)—explicitly sets the switch state.

void triggerEvent ( )—receives a trigger event that will be relayed on to one of two trigger event listeners based on the switch state.

Methods inherited from class java.lang.Object: equals, getClass, hashCode, notify, notifyAll, toString, wait.

Constructor Detail Related to the Switch Class: public Switch ( ).

Method Detail Related to the Switch Class for getState: public boolean getState( ). Returns the switch state.

Method Detail Related to the Switch Class for setState: public void setState (boolean value). Explicitly sets the switch state.

Method Detail Related to the Switch Class for assertEvent: public void assertEvent (boolean value). Receives an Assert event that will set the switch state. Specified by: assertEvent in interface AssertEventListener. Parameters: active—whether the mode is asserted or non-asserted.

Method Detail Related to the Switch Class for triggerEvent: public void triggerEvent ( ). Receives a trigger event that will be relayed on to one of two trigger event listeners based on the switch state. Specified by: triggerEvent in interface TriggerEventListener.

Method Detail Related to the Switch Class for addTrueListener: public void addTrueListener (TriggerEventListener listener). Registers a TriggerEventListener to be notified when an input trigger is received and the switch is in the true state. Parameters: listener—the receiver of the triggerEvent.

Method Detail Related to the Switch Class for removeTrueListener: public void removeTrueListener (TriggerEventListener listener). Unregisters a triggerEventListener so it will no longer receive an event. Parameters: listener—the listener that will no longer receive events.

Method Detail Related to the Switch Class for addFalseListener: public void addFalseListener (TriggerEventListener listener). Registers a TriggerEventListener to be notified when an input trigger is received and the switch is in the false state. Parameters: listener—the receiver of the triggerEvent.

Method Detail Related to the Switch Class for removeFalseListener: public void removeFalseListener (TriggerEventListener listener). Unregisters a triggerEventListener so it will no longer receive an event. Parameters: listener—the listener that will no longer receive events.

The following describes the aRTEC TriggerData component (public class TriggerData; extends java.lang.Object; implements TriggerEventListener), a component that sends a data event with a preset value whenever a trigger event is received.

Constructor Summary Related to the TriggerData Class: TriggerData ( ).

Method Summary Related to the TriggerData Class: void addDataListener (DataEventListener listener)—registers a DataEventListener to be notified when a trigger event is received.

int getDataValue ( )—returns the value that will be passed in the data event.

void removeDataListener (DataEventListener listener)—unregisters a DataEventListener so it will no longer receive events.

void setDataValue (int value)—sets the value that will be passed in the data event.

void triggerEvent ( )—sends a data event with the preset value.

Methods inherited from class java.lang.Object: equals, getClass, hashCode, notify, notifyAll, toString, wait.

Constructor Detail Related to the TriggerData Class: public TriggerData ( ).

Method Detail Related to the TriggerData Class for getDataValue: public int getDataValue ( ). Returns the value that will be passed in the data event.

Method Detail Related to the TriggerData Class for setDataValue: public void setDataValue (int value). Sets the value that will be passed in the data event.

Method Detail Related to the TriggerData Class for triggerEvent: public void triggerEvent ( ). Sends a data event with the preset value. Specified by: triggerEvent in interface TriggerEventListener.

Method Detail Related to the TriggerData Class for addDataListener: public void addDataListener (DataEventListener listener). Registers a DataEventListener to be notified when a trigger event is received. The datavalue property will be passed as the parameter to the event. Parameters: listener—the receiver of the DataEvent.

Method Detail Related to the TriggerData Class for removeDataListener: public void removeDataListener (DataEventListener listener). Unregisters a DataEventListener so it will no longer receive events. Parameters: listener—the listener that will no longer receive events.

The following describes the aRTEC TriggerToAssert component (public class TriggerToAssert; extends java.lang.Object; implements TriggerEventListener), a component that converts two Trigger input events to one Assert output event. An assertEvent is fired whenever a trigger input event is received. True is passed when the positive trigger event is received and false is passed when the negative trigger event is received. The class itself implements the positive trigger listener. You must call getNegativeTriggerListener to get a listener for trigger events that will send negative assert events.

Constructor Summary Related to the TriggerToAssert Class: TriggerToAssert ( ).

Method Summary Related to the TriggerToAssert Class: void addAssertListener (AssertEventListener listener)—registers an AssertEventListener to be notified when a trigger event is received.

TriggerEventListener getNegativeTriggerListener ( )—returns a TriggerEventListener that will send an assert event with a false value.

void removeAssertListener (AssertEventListener listener)—unregisters an AssertEventListener so it will no longer receive events.

void triggerEvent ( )—sends an assert event with a true value.

Methods inherited from class java.lang.Object: equals, getClass, hashCode, notify, notifyAll, toString, wait.

Constructor Detail Related to the TriggerToAssert Class: public TriggerToAssert ( ).

Method Detail Related to the TriggerToAssert Class for triggerEvent: public void triggerEvent ( ). Sends an assert event with a true value. Specified by: triggerEvent in interface TriggerEventListener.

Method Detail Related to the TriggerToAssert Class for getNegativeTriggerListener: public TriggerEventListener getNegativeTriggerListener( ). Returns a TriggerEventListener that will send an assert event with a false value.

Method Detail Related to the TriggerToAssert Class for addAssertListener: public void addAssertListener (AssertEventListener listener). Registers an AssertEventListener to be notified when a trigger event is received. Parameters: listener—the receiver of the assertEvent.

Method Detail Related to the TriggerToAssert Class for removeAssertListener: public void removeAssertListener (AssertEventListener listener). Unregisters an AssertEventListener so it will no longer receive events. Parameters: listener—the listener that will no longer receive events.

An event-generating software component 100 can send an event in a unicast or a multicast manner. In a unicast transmission, the event-generating software component 100 sends an event to a single listener software component 102. In a multicast transmission, the event-generating software component 100 can send the same event to more than one listener software components. Events that are sent in a multicast manner are referred to as multicast events.

In the JavaBean Component Architecture, listener software components register to receive a particular type event or events. A JavaBean can be set up to transmit events in a unicast or in a multicast manner. To implement multicast events, JavaBeans store a vector of the registered listeners. When the related event occurs, the vector is traversed and the multicast event is sent to each of the registered listeners.

It is possible, however, to implement an event multicaster object (or multicaster) instead of a vector. An event multicaster object is an event listener that relays the event to two additional listeners. if one of the additional listeners is also an event multicaster object, the event is relayed to two more listeners. In this manner any number of listeners can be registered without the use of a vector. The use of the event multicaster objects is hidden behind the event registration methods.

Use of the event multicaster objects instead of a vector provides benefits when in a time-sensitive environment. When a single listener is registered and an event is sent, the event can be sent by a single interface call without the looping and overhead associated with the vector approach. As more listeners are registered for the same event, however, the event will be routed through multiple multicasters thereby creating additional overhead. It will be rare, however, to have a situation where enough listeners are registered to create more overhead than would be created by traversing a vector.

Further, the event multicaster objects can be reusable. Implementing reusable event multicaster objects eliminates the overhead that would be associated with the creation of new multicasters. Pre-existing event multicaster objects are simply put into service as needed when new listener software components are registered (added). When a listener software component or components are to be removed, the appropriate multicaster(s) are taken out of service and are again available for reuse when a listener is added. Further, in one embodiment, listener software components are added only at the end of the tree structure. FIGS. 2 through 5 depict features related to the functioning and structure of the multicast system of the present invention.

Figure 2:
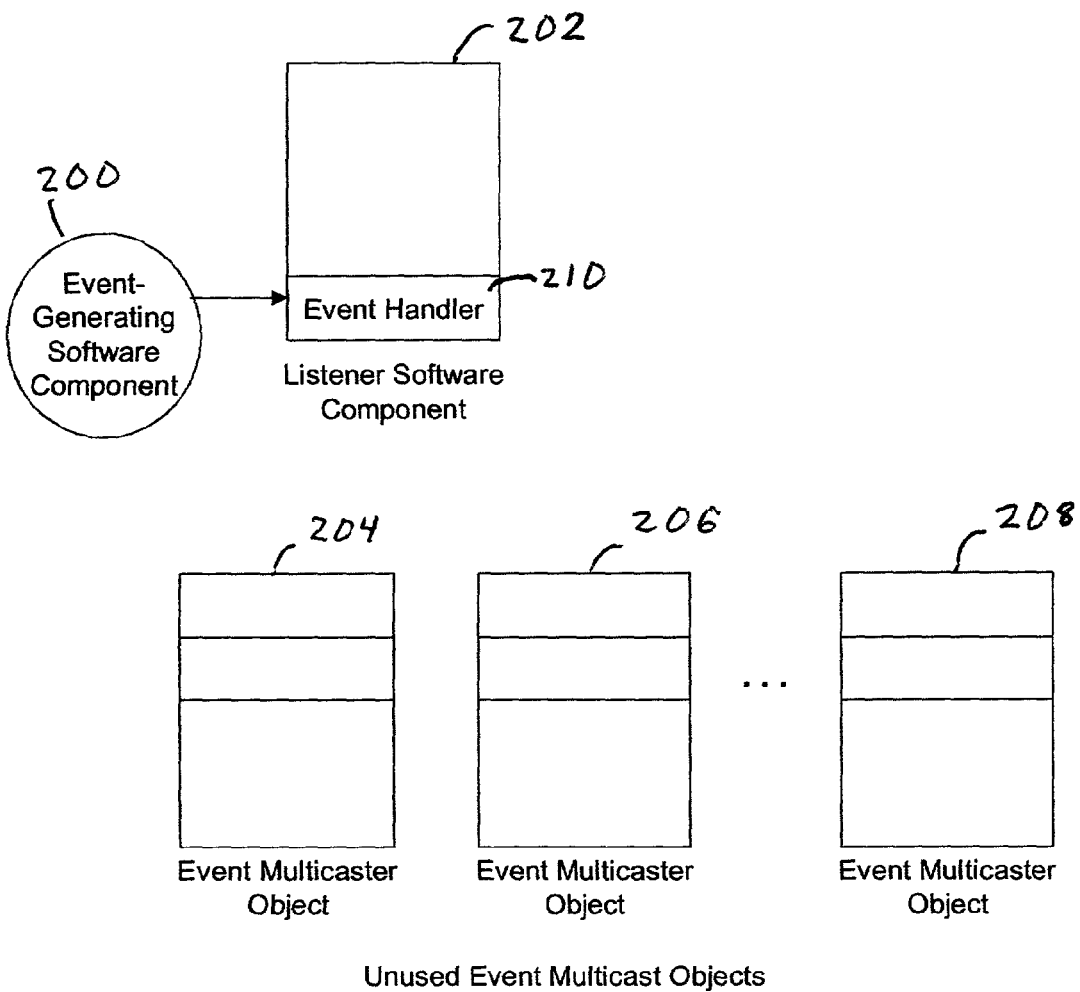
FIG. 2 depicts a transmission environment involving an event-generating software component, a single listener software component and a plurality of unused event multicaster objects.

FIG. 2 depicts a transmission environment including an event-generating software component 200, a single listener software component 202 and a plurality of unused event multicaster objects, three of which (204, 206, 208) are specifically depicted. The listener software component 202 includes code 210 to be executed upon receiving an event notification of an event for which it has registered. In the structure of FIG. 2, an event multicaster object 204, 206, 208 is not needed and they consequently remain unused.

Figure 3:
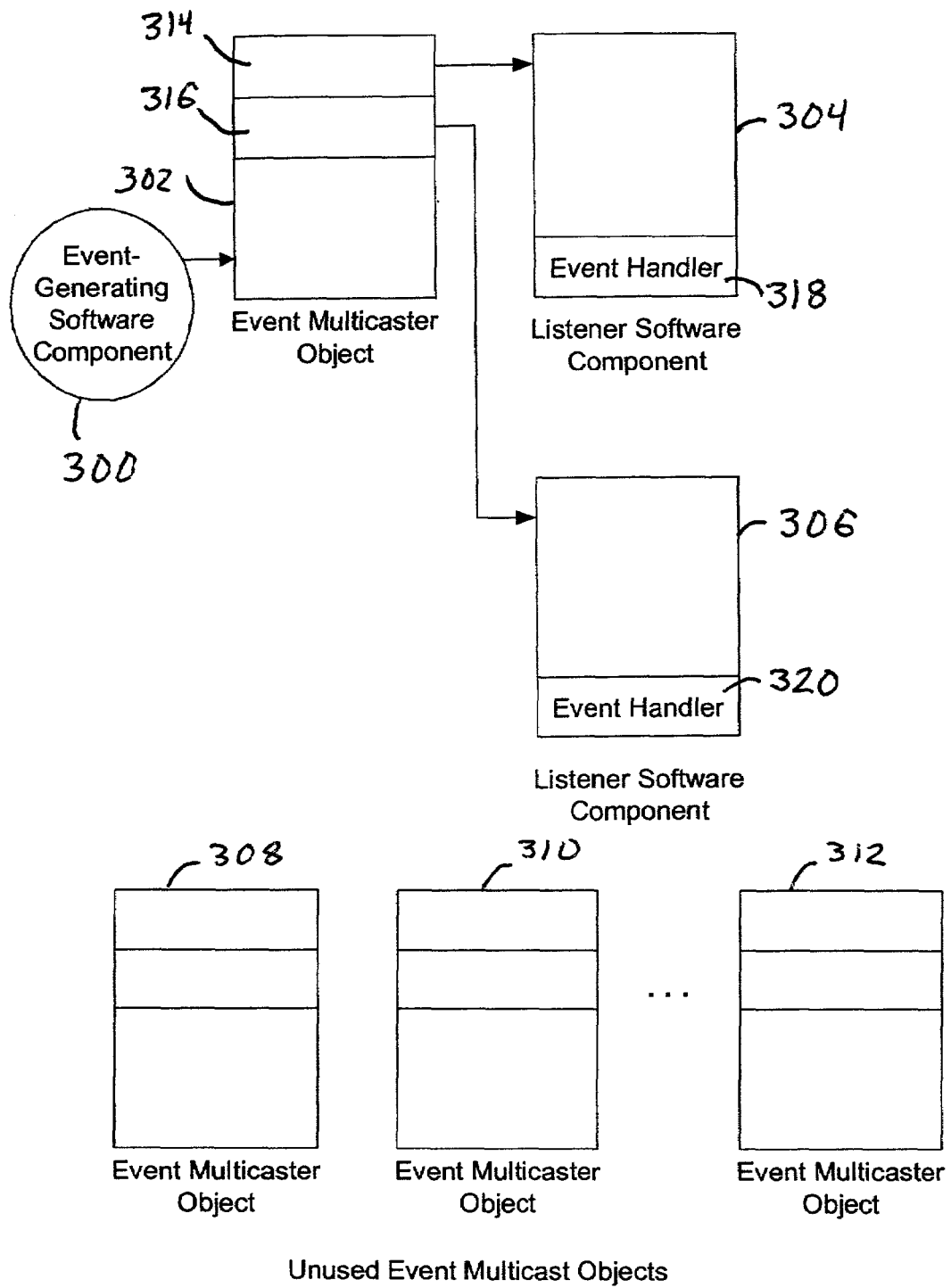
FIG. 3 depicts a multicast transmission environment involving an event-generating software component, an event multicaster object and two listener software components.

FIG. 3 depicts a multicast transmission environment involving an event-generating software component 300, an event multicaster object 302 and two listener software components 304, 306, and a plurality of unused event multicaster objects 308, 310, 312. (The unused Event Multicaster Objects are not specifically depicted in FIGS. 1, 4 and 5, but they can be used and included in the same manner in those figures.) Since there are now two listener software objects 304, 306 an event multicaster object 302 is required. The event multicaster object 302 includes a first storage location 314 referencing one of the event listener components 304 and a second storage location 316 referencing the other event listener component 306. In one embodiment, the first listener software component to register (for example the listener software component 202, FIG. 2) is the listener software component 304 referenced by the first storage location 314 and the next listener software component to register is the listener software component referenced by the second storage location 316. Each of the listener software components 304, 306 includes code 318, 320 to be executed upon receiving an event notification of an event for which it has registered.

Figure 4:
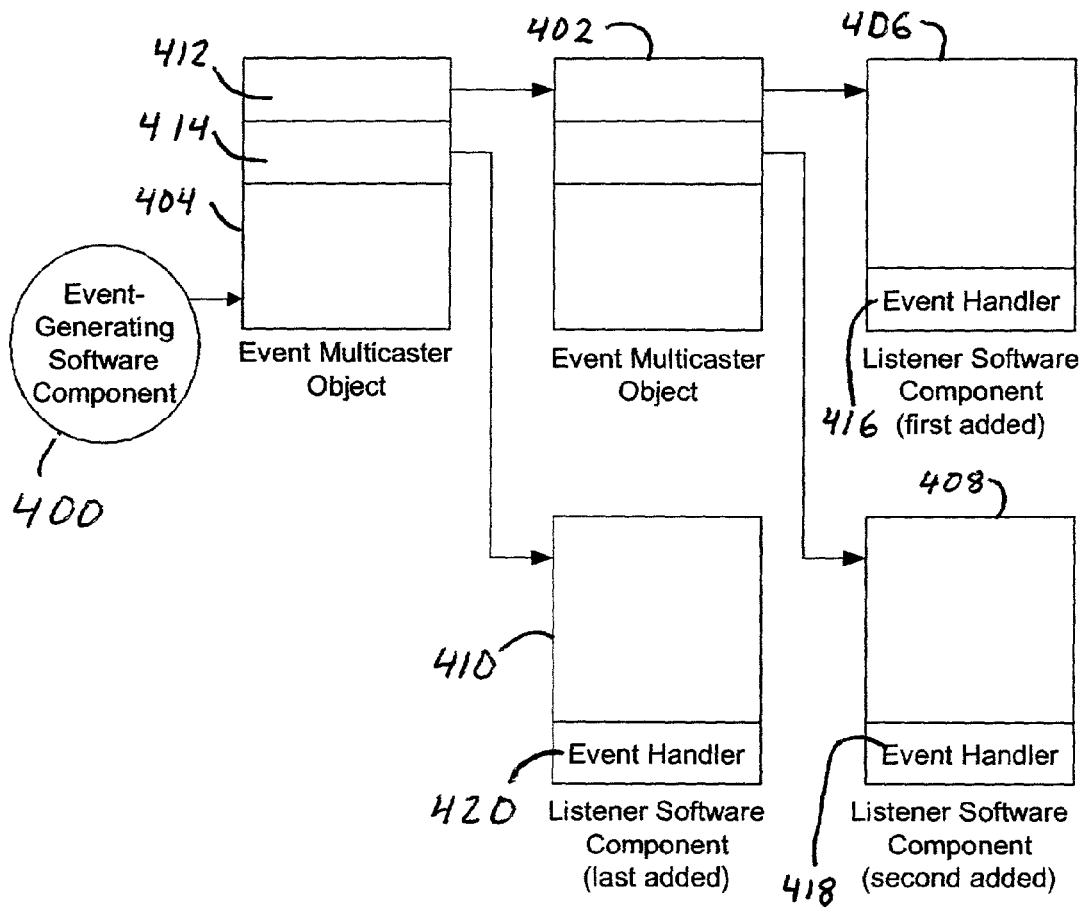
FIG. 4 depicts a multicast transmission environment involving an event-generating software component, two event multicaster objects and three listener software components.

FIG. 4 depicts a multicast transmission environment involving an event-generating software component 400, two event multicaster objects 402, 404 and three listener software components 406, 408, 410. An additional event multicaster object 404 is needed to reference the third listener software component 410. As with the first event multicaster object 402, FIG. 4; 302, FIG. 3, the second event multicaster object 402 includes a first storage location 412 referencing the first event multicaster object 402 and a second storage location 414 referencing the third event listener component 410. Each of the listener software components 406, 408, 410 includes code 416, 418, 420 to be executed upon receiving an event notification of an event for which it has registered. Again, in one embodiment, the first listener software component to register is listener software component 406, the second to register takes the position of listener software component 408 and the third to register is listener software component 410.

Figure 5:
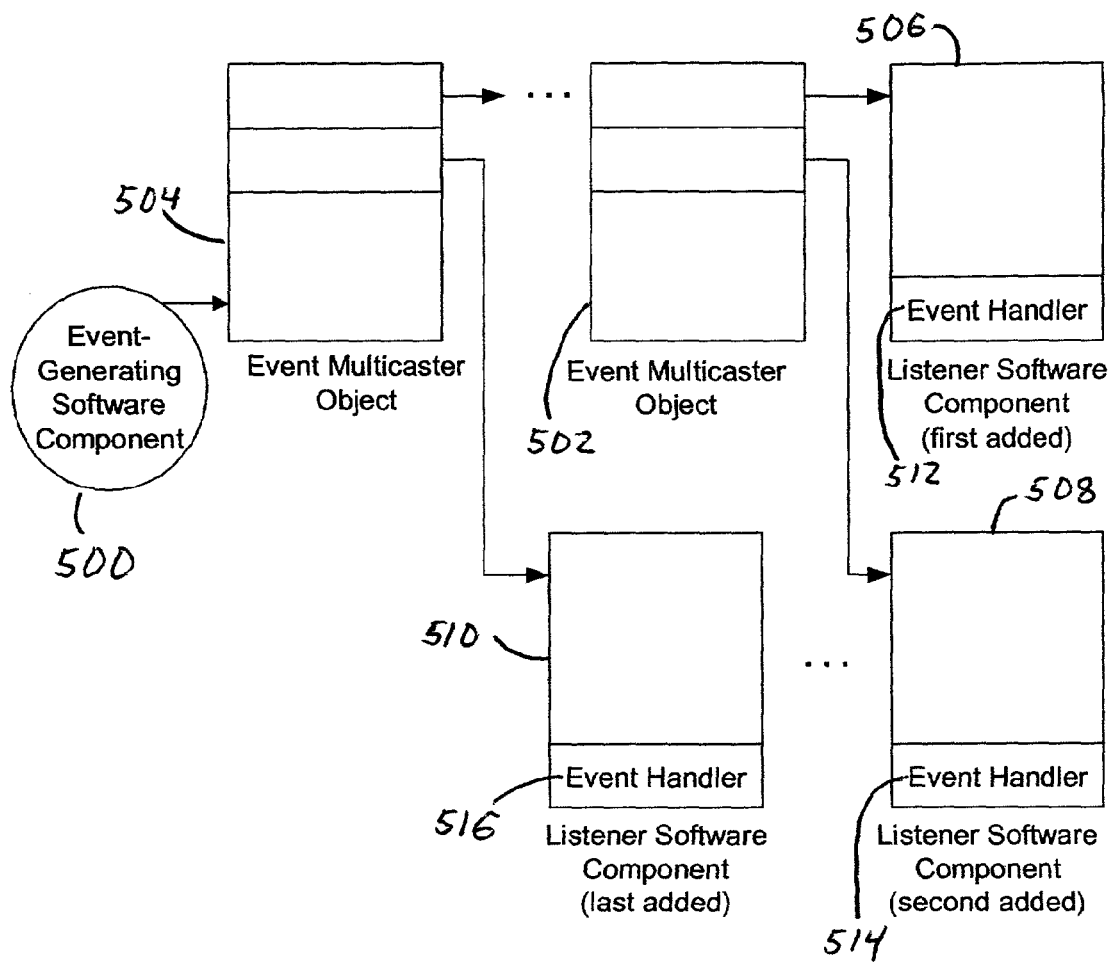
FIG. 5 depicts a multicast transmission environment involving an event-generating software component, a plurality of event multicaster objects and a plurality of listener software components.

It will be appreciated that the structure expanded from FIGS. 2 through 4 can be expanded in a similar fashion so as to include any number of listener software components. FIG. 5 depicts a multicast transmission environment involving an event-generating software component 500, a plurality of event multicaster objects 502, 504 and a plurality of listener software components, three of which (506, 508, 510) are specifically depicted. As indicated above, each event multicaster object, with the exception of the first event multicaster object 502, will reference one listener software component and one event multicaster object. Each listener software component can include code 512, 514, 516 to be executed upon receiving an event notification of an event for which it has registered.

The various listener software components can be added to the structure according to the order in which they are registered. Further, if desired, when a listener software component is to be removed from the structure, the structure can be reconstituted. Alternatively, removal of a listener software component can be accomplished by simply deleting the reference to it in the event multicaster object with which it is related. Finally, in one embodiment, when an event is communicated through any of the structures of FIGS. 3 through 5, it can be sent first to the first registered listener software component (for example the listener software component 506, FIG. 5) and then to the next registered listener software component (for example the listener software component 508, FIG. 5) and so forth to each of the other listener software components in the order in which they were registered as listeners.

Additional detail and description related to specific aRTEC multicast classes will now be presented.

The following provides a description of the AssertEventMulticaster class (public class AssertEventMulticaster; extends java.lang.Object; implements AssertEventListener): Class AssertEventMulticaster is an event multicaster for the event AssertEvent. Each instance branches to two listeners. Includes static helper routines for adding and removing listeners to the event throwing class.

Method Summary: 1) static AssertEventListener add (AssertEventListener node, AssertEventListener listener). Helper routine for any addAssertEventListener routine. 2) void assertEvent (Boolean active). The event listener. 3) static AssertEventListener remove (AssertEventListener node, AssertEventListener listener). Helper routine for any removeAssertEventListener routine.

Methods inherited from class java.lang.Object: equals, getClass, hashCode, notify, notifyAll, toString, wait.

Method Detail: 1) public static AssertEventListener add (AssertEventListener node, AssertEventListener listener). Helper routine for any addAssertEventListener routine. Adds multicaster nodes as necessary to support "n" event listeners. The class throwing the AssertEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static AssertEventListener remove (AssertEventListener node, AssertEventListener listener). Helper routine for any removeAssertEventListener routine. Removes multicaster nodes as necessary to support "n-1" event listeners. The class throwing the AssertEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void assertEvent (boolean active). The event listener. Relays the passed event to two children listeners. Specified by: assertEvent in interface AssertEventListener. Parameters: source—the mode or state that is changing; active if the mode is becoming active or inactive.

The following provides a description of the DataEventMulticaster class (public class DataEventMulticaster; extends java.lang.Object; implements DataEventListener): Class DataEventMulticaster is an event multicaster for the event DataEvent. Each instance branches to two listeners. Includes static helper routines for adding and removing listeners to the event throwing class.

Method Summary: 1) static DataEventListener add (DataEventListener node, DataEventListener listener). Helper routine for any addDataEventListener routine. 2) void dataEvent (int value). The event listener. 3) static DataEventListener remove (DataEventListener node, DataEventListener listener). Helper routine for any removeDataEventListener routine.

Methods inherited from class java.lang.Object: equals, getclass, hashcode, notify, notifyAll, toString, wait.

Method Detail: 1) public static DataEventListener add (DataEventListener node, DataEventListener listener). Helper routine for any addDataEventListener routine. Adds multicaster nodes as necessary to support "n" event listeners. The class throwing the DataEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static DataEventListener remove (DataEventListener node, DataEventListener listener). Helper routine for any removeDataEventListener routine. Removes multicaster nodes as necessary to support "n-1" listeners. The class throwing the DataEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void dataEvent (int value). The event listener. Relays the passed event to two children listeners. Specified by: dataEvent in interface DataEventListener. Parameters: source—the mode or state that is changing; active—if the mode is becoming active or inactive.

The following provides a description of the DoubleLongEventMulticaster class (public class DoubleLongEventMulticaster; extends java.lang.Object; implements DoubleLongEventListener): Class DoubleLongEventMulticaster is an event multicaster for the event DoubleLongEvent. Each instance branches to two listeners. Includes static helper routines for adding and removing listeners to the event throwing class.

Method Summary: 1) static DoubleLongEventListener add (DoubleLongEventListener node, DoubleLongEventListener listener). Helper routine for any addDoubleLongEventListener routine. 2) void doubleLongEvent (double doublevalue, long longValue). The event listener. 3) static DoubleLongEventListener remove (DoubleLongEventListener node, DoubleLongEventListener listener). Helper routine for any removeDoubleLongEventListener routine.

Methods inherited from class java.lang.Object: equals, getClass, hashCode, notify, notifyAll, toString, wait.

Method Detail: 1) public static DoubleLongEventListener add (DoubleLongEventListener node, DoubleLongEventListener listener). Helper routine for any addDoubleLongEventListener routine. Adds multicaster nodes as necessary to support "n" event listeners. The class throwing the DoubleLongEvent should have one reference to a listener and treat it like a unicast event. The add and remove methods should be used to maintain a transparent tree of multicasters to support multiple listeners. Parameters: node—the current value of the topmost event listener; listener—new single event listener to add to the tree. Returns: the replacement node for the topmost event listener.

2) public static DoubleLongEventListener remove (DoubleLongEventListener node, DoubleLongEventListener listener). Helper routine for any removeDoubleLongEventListener routine. Removes multicaster nodes as necessary to support "n-1" event listeners. The class throwing the DoubleLongEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void doubleLongEvent (double doublevalue, long longvalue). The event listener. Relays the passed event to two children listeners. Specified by: doubleLongEvent in interface DoubleLongEventListener. Parameters: source—the mode or state that is changing, active—if the mode is becoming active or inactive.

The following provides a description of the DoubleEventMulticaster class (public class DoubleEventMulticaster; extends java.lang.Object; implements DoubleEventListener): Class DoubleEventMulticaster is an event multicaster for the event DoubleEvent. Each instance branches to two listeners. Includes static helper routines for adding and removing listeners to the event throwing class.

Method Summary: 1) static DoubleEventListener add (DoubleEventListener node, DoubleEventListener listener). Helper routine for any addDoubleEventListener routine. 2) void doubleEvent (double value). The event listener. 3) static DoubleEventListener remove (DoubleEventListener node, DoubleEventListener listener). Helper routine for any removeDoubleEventListener routine.

Methods inherited from class java.lang.Object: equals, getClass, hashCode, notify, notifyAll, toString, wait.

Method Detail: 1) public static DoubleEventListener add (DoubleEventListener node, DoubleEventListener listener). Helper routine for any addDoubleEventListener routine. Adds multicaster nodes as necessary to support "n" event listeners. The class throwing the DoubleEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static DoubleEventListener remove (DoubleEventListener node, DoubleEventListener listener). Helper routine for any removeDoubleEventListener routine. Removes multicaster nodes as necessary to support "n-1" event listeners. The class throwing the DoubleEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void doubleEvent (double value). The event listener. Relays the passed event to two children listeners. Specified by: doubleEvent in interface DoubleEventListener. Parameters: source—the mode or state that is changing, active—if the mode is becoming active or inactive.

The following provides a description of the FloatEventMulticaster class (public class FloatEventMulticaster; extends java.lang.Object; implements FloatEventListener). Class FloatEventMulticaster is an event multicaster for the event FloatEvent. Each instance branches to two listeners. Includes static helper routines for adding and removing listeners to the event throwing class.

Method Summary: 1) static FloatEventListener add (FloatEventListener node, FloatEventListener listener). Helper routine for any addFloatEventListener routine. 2) void floatEvent (float value). The event listener. 3) static FloatEventListener remove (FloatEventListener node, FloatEventListener listener). Helper routine for any removeFloatEventListener routine.

Methods inherited from class java.lang.Object: equals, getClass, hashcode, notify, notifyAll, toString, wait.

Method Detail: 1) public static FloatEventListener add (FloatEventListener node, FloatEventListener listener). Helper routine for any addFloatEventListener routine. Adds multicaster nodes as necessary to support "n" event listeners. The class throwing the FloatEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static FloatEventListener remove (FloatEventListener node, FloatEventListener listener). Helper routine for any removeFloatEventListener routine. Removes multicaster nodes as necessary to support "n-1" event listeners. The class throwing the FloatEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void floatEvent (float value). The event listener. Relays the passed event to two children listeners. Specified by: floatEvent in interface FloatEventListener. Parameters: source—the mode or state that is changing; active—if the mode is becoming active or inactive.

The following provides a description of the LongEventMulticaster class (public class LongEventMulticaster; extends java.lang.Object; implements LongEventListener). Class LongEventMulticaster is an event multicaster for the event LongEvent. Each instance branches to two listeners. Includes static helper routines for adding and removing listeners to the event throwing class.

Method Summary: 1) static LongEventListener add (LongEventListener node, LongEventListener listener). Helper routine for any addLongEventListener routine. 2) void longEvent (long value). The event listener. 3) static LongEventListener remove (LongEventListener node, LongEventListener listener). Helper routine for any removeLongEventListener routine.

Methods inherited from class java.lang.Object: equals, getClass, hashCode, notify, notifyAll, toString, wait.

Method Detail: 1) public static LongEventListener add (LongEventListener node, LongEventListener listener). Helper routine for any addLongEventListener routine. Adds multicaster nodes as necessary to support "n" event listeners. The class throwing the LongEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static LongEventListener remove (LongEventListener node, LongEventListener listener). Helper routine for any removeLongEventListener routine. Removes multicaster nodes as necessary to support "n-1" event listeners. The class throwing the LongEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void longEvent (long value). The event listener. Relays the passed event to two children listeners. Specified by: longEvent in interface LongEventListener. Parameters: source—the mode or state that is changing; active—if the mode is becoming active or inactive.

The following provides a description of the StringEvent-Multicaster class (public class StringEventMulticaster; extends java.lang.Object; implements StringEventListener): Class StringEventMulticaster is an event multicaster for the event StringEvent. Each instance branches to two listeners Includes static helper routines for adding and removing listeners to the event throwing class.

Method Summary: 1) static StringEventListener add (StringEventListener node, StringEventListener listener). Helper routine for any addStringEventListener routine. 2) static StringEventListener remove (StringEventListener node, StringEventListener listener). Helper routine for any removeStringEventListener routine. 3) void stringEvent (java.lang.String value). The event listener.

Methods inherited from class java.lang.Object: equals, getClass, hashcode, notify, notifyAll, toString, wait.

Method Detail: 1) public static StringEventListener add (StringEventListener node, StringEventListener listener). Helper routine for any addStringEventListener routine. Adds multicaster nodes as necessary to support "n" event listeners. The class throwing the StringEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static StringEventListener remove (StringEventListener node, StringEventListener listener). Helper routine for any removeStringEventListener routine. Removes multicaster nodes as necessary to support "n-1" event listeners. The class throwing the StringEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void stringEvent (java.lang.String value). The event listener. Relays the passed event to two children listeners. Specified by: stringEvent in interface StringEventListener. Parameters: source—the mode or state that is changing; active—if the mode is becoming active or inactive.

The following provides a description of the TriggerEvent-Multicaster class (public class TriggerEventMulticaster; extends java.lang.Object; implements TriggerEventListener): Class TriggerEventMulticaster is an event multicaster for the event TriggerEvent. Each instance branches to two listeners. Includes static helper routines for adding and removing listeners to the event throwing class.

Method Summary: 1) static TriggerEventListener add (TriggerEventListener node, TriggerEventListener listener). Helper routine for any addTriggerEventListener routine. 2) static TriggerEventListener remove (TriggerEventListener node, TriggerEventListener listener). Helper routine for any removeTriggerEventListener routine. 3) void triggerEvent ( ). The event listener.

Methods inherited from class java.lang.Object: equals, getClass, hashCode, notify, notifyAll, toString, wait.

Method Detail: 1) public static TriggerEventListener add (TriggerEventListener node, TriggerEventListener listener). Helper routine for any addTriggerEventListener routine. Adds multicaster nodes as necessary to support "n" event listeners. The class throwing the TriggerEvent should have one reference to a listener and treat it like a unicast event. The add and remove methods should be used to maintain a transparent tree of multicasters to support multiple listeners. Parameters: node—the current value of the topmost event listener; listener—the new single event listener to add to the tree. Returns: the replacement node for the topmost event listener.

2) public static TriggerEventListener remove (TriggerEventListener node, TriggerEventListener listener). Helper routine for any removeTriggerEventListener routine. Removes multicaster nodes as necessary to support "n-1" event listeners. The class throwing the TriggerEvent should have one reference to a listener and treat it like a unicast event. The add and remove methods should be used to maintain a transparent tree of multicasters to support multiple listeners. Parameters: node—the current value of the topmost event listener; listener—to remove from the multicast tree. Returns: the replacement node for the topmost event listener.

3) public void triggerEvent ( ). The event listener. Relays the passed event to two children listeners. Specified by: triggerEvent in interface TriggerEventListener. Parameters: source—the mode or state that is changing; active—if the mode is becoming active or inactive.

In the aRTEC model, each of the EventMulticaster classes maintains a list of the EventListeners registered to receive notification of the occurrence of the particular event. As new EventListeners are added, the new elements appear on the appropriate EventMulticaster list. As EventListeners are removed, the event multicaster objects are added to a listing of free nodes so as to avoid garbage collection generation. Subsequent listener additions will reuse any event multicaster objects that have been made available as a result of previous removals. To invoke any of the multicast events, the appropriate EventMulticaster calls the appropriate Event( ) methods of the related EventListeners starting with the first listener software component added and proceeding in order to the last listener software component registered. A communication of an event with only a single registered event listener component is actually implemented as a multicast that has just a single listener on the multicast list.

Figure 6:
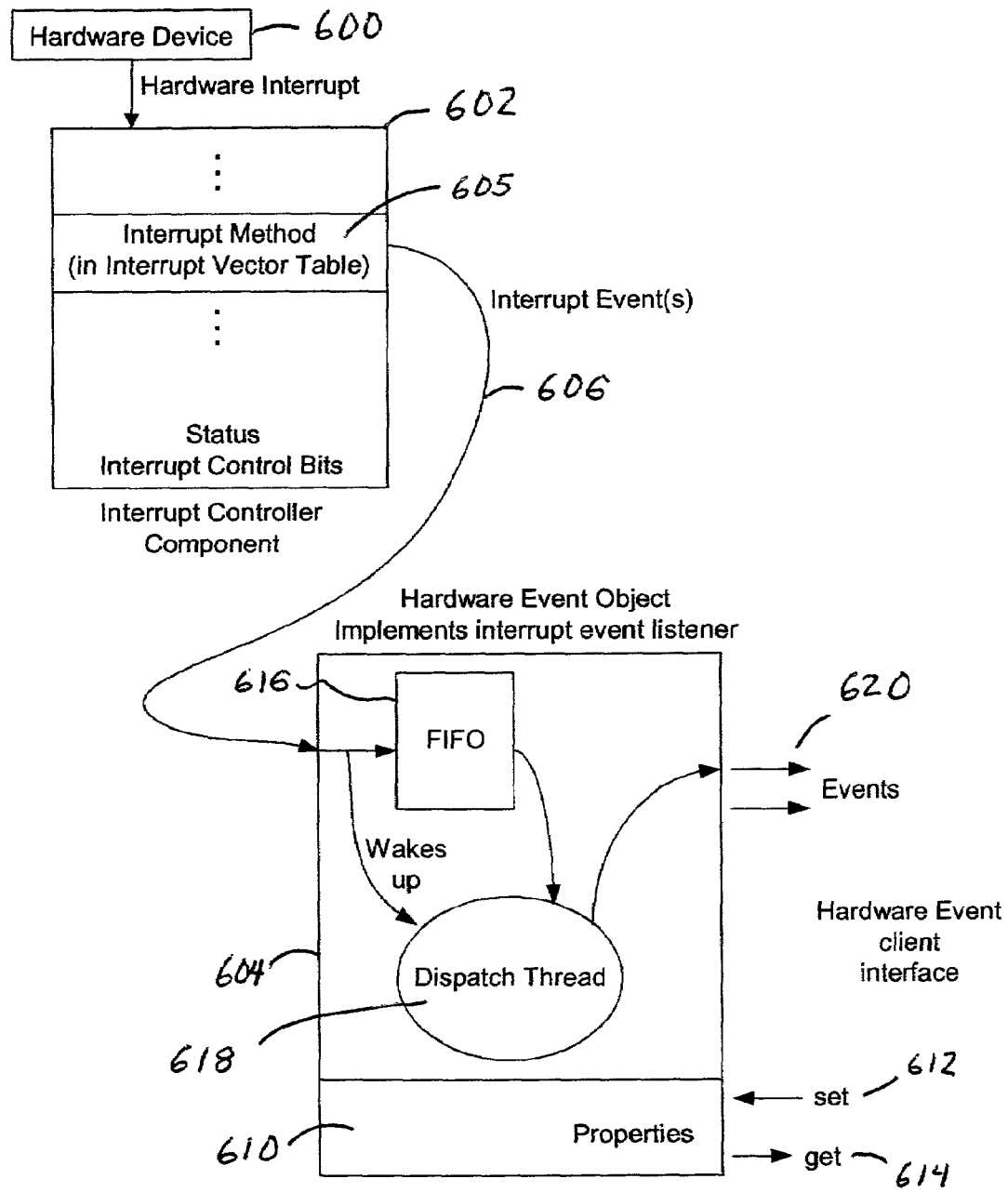
FIG. 6 depicts an architecture interfacing a hardware device and client software, the architecture including a hardware device, an interrupt controller component and a hardware event object.

FIG. 6 depicts an architecture for interfacing a hardware device and client software, the architecture including a hardware device 600, an interrupt controller component 602 and a hardware event object 604. Starting with the hardware end of the architecture, the hardware component 600 can be any of a wide variety of such components. For example, the hardware device 600 can be a button, key, or any other such input or signaling device. It can also be a pin of an interface. For example, it can be a pin of a General Purpose digital Input/Output (GPIO) port. A change in state of the hardware device, for example, will cause a signal to be output from the hardware device 600.

The signal from the hardware device 600 is passed to the interrupt controller component 602 and the interrupt controller triggers the appropriate interrupt method 605 from its interrupt vector table and communicates 606 it to the hardware event object 604. The properties 610 of the hardware event object 604 can be set and retrieved via setter 612 and getter 614 methods. The properties 610 include PinID, PinState, OutputPin, PinReportPolicy and ReportThread.

The hardware event object 604 includes a first-in-first-out (FIFO) data structure 616 and a dispatch thread 618.

Via the architecture of FIG. 6, the interrupt can eventually precipitate the sending of a software event to the appropriate user event handlers of the registered listener software components. Since it is often not desirable to send these events at an interrupt priority level, a dispatch thread 618 is included. The dispatch thread 618 can wait for the state change and then send an event notification to user code at a priority level that is lower than the original interrupt priority level.

Upon receipt by the hardware event object, the interrupt event 606 is communicated directly to the dispatch thread 618 to wake it up if necessary. The interrupt event 606 is also placed into the FIFO queue 616. The dispatch thread 618 then works through and services each received interrupt event 606 in the order in which it was received. As it services each of the interrupt events received from the FIFO 616, the dispatch thread 618 causes the appropriate software events to be generated and output 620.

The dispatch thread 618 is a thread that sleeps until some event requiring servicing is received. It is awakened by an invocation of its wake method (upon receipt of an interrupt event for example) and it will then service the tasks until each has been completed. It is usually desirable to give the dispatch thread 618 an elevated priority level (for example one higher than any calling thread). Once awakened, the dispatch thread will poll all registered listeners and service them if required.

When, for example, the hardware device 600 is a GPIO pin, a change in pin state will precipitate the generation of an interrupt. An interrupt event 606 will subsequently be forwarded to the hardware event object 604. Each pin state change will thus by forwarded to the hardware event object 604 and placed into the FIFO 616. The dispatch thread 618 will service each interrupt event by forwarding it as a software event to each of the event's registered listeners. In this embodiment, each pin of the port would be associated with a dedicated interrupt method and hardware event object. In one embodiment, the default is to use one dispatch thread for all of the GPIO pins. If, however, different priorities are required for different pins, a new dispatch thread can be assigned to each pin.

If desired, the architecture of FIG. 6 can be used with the model disclosed in relation to FIG. 1 or as disclosed in FIGS. 1 though 5. In such a case, the software event output 620 from the hardware event object 604 can be a cracked event. Further, the outputted cracked event, if desired, can then be multicasted in the manner disclosed in FIGS. 2 through 5.

It is thought that the method and apparatus of the present invention will be understood from the description provided throughout this specification, including the drawings and the appended claims, and that it will be apparent that various changes may be made in the form, construct steps and arrangement of the parts and steps thereof, without departing from the spirit and scope of the invention or sacrificing all of their material advantages. The forms herein described are merely representative embodiments thereof. For example, although some embodiments of the invention have been described in relation to the JavaBeans Component Architecture and the JAVA programming language, the present inventions are capable of being used with other types of component architectures and programming languages that have been, or will be, developed.

The invention claimed is:

1. A component model for use in a time sensitive embedded software application, comprising:

an event-generating software component, comprising code to generate a notification in response to an event;

a first listener software component, comprising code to receive an event notification;

an event transmission object, said event transmission object comprising a primitive data type parameter that conveys data describing an event generated by said event-generating software component to said first listener software component;

a first reusable event multicaster object, comprising a first re reference identifying said first listener software component, said first reusable event multicaster object further comprising a first multicaster object event input interface by which said first reusable event multicaster object can receive said event transmission object and pass, via said first reference, said event transmission object to said first listener software component;

a second reusable event multicaster object, said second reusable event multicaster object comprising a first reference, said first reference identifying said first reusable event multicaster object, said second reusable event multicaster object further comprising a second multicaster object event input interface, wherein said second reusable event multicaster object can receive said event transmission object and pass, via said first reference, said event transmission object to said first reusable event multicaster object;

a second listener software component comprising code to receive said event notification, and wherein said first reusable event multicaster object further comprises a second reference, said second reference identifying said second listener software component, wherein said first reusable event multicaster object can pass, via said second reference, said event transmission object to said second listener software component;

wherein said first listener software component comprises a first event handler, wherein said second listener software component comprises a second event handler and wherein said first reusable event multicaster object further comprises code to call said first event handler and then to call said second event handler; and a third listener software component comprising code to receive said event notification, and wherein said second reusable event multicaster object further comprises a second reference, said second reference identifying said third listener software component, wherein said second reusable event multicaster object can pass, via said second reference, said event transmission object to said third listener software component.

2. The component model of claim 1, wherein said third listener software component comprises a third event handler, and wherein said second reusable event multicaster object further comprises code to pass said event transmission object to said first reusable event multicaster object and to call said third event handler after said second event handler has been called by said first reusable event multicaster object.

3. The component model of claim 1, wherein said event-generating software component further comprises a listener add method.

4. The component model of claim 1, wherein said event-generating software component further comprises:

a hardware interrupt signal input interface;

a first-in-first-out data structure coupled with said hardware interrupt signal input interface and comprising a first-in-first-out output interface; and a dispatch thread component comprising, an event input coupled with said first-in-first-out output, and a dispatch thread output interface, said dispatch thread component creating a software event to be output via said dispatch thread output interface.

5. The component model of claim 4, wherein said dispatch thread component further comprises a wake-up input interface coupled with said hardware interrupt signal input interface.

6. The component model of claim 5, further comprising an interrupt controller component, said interrupt controller component comprising a plurality of interrupt methods, said interrupt controller component further comprising an interrupt event signal output coupled with said hardware interrupt signal input interface.

7. The component model of claim 6, further comprising a hardware interrupt generating component coupled with said interrupt controller component, and wherein an interrupt method of said plurality of interrupt methods is responsive to an interrupt signal generated by said hardware interrupt generating component.

8. The component model of claim 7, wherein said hardware interrupt generating component comprises an input/output pin.

9. The component model of claim 8, wherein said input/output pin is a pin of a General Purpose Input Output interface.

10. The component model of claim 4, wherein said dispatch thread component further comprises at least one associated property, and further comprising a property getter interface and a property setter interface each capable of accessing said at least one associated property.

11. The component model of claim 1, wherein said event-generating software component further comprises:
a hardware interrupt signal input interface;
a first-in-first-out data structure coupled with said hardware interrupt signal input interface and comprising a first-in-first-out output interface; and
a dispatch thread component comprising, an event input coupled with said first-in-first-out output, and a dispatch thread output interface, said dispatch thread component creating a software event to be output via said dispatch thread output interface.

12. An event transmission method for use in a time sensitive embedded software application, comprising the steps of:
(a) establishing an event notification system having an event-generating software component and a first listener software component registered to receive an event notification generated by the event-generating software component;
(b) receiving a request to register a second listener software component to receive an event notification generated by the event-generating software component;
(c) adding a first reusable event multicaster object, retrieved from a plurality of available reusable event multicaster objects, to the event notification system such that the first reusable event multicaster object can receive an event notification generated by the event-generating software component and can forward the received event notification to the first listener software component;
(d) incorporating a second listener software component into the event notification system such that the first reusable event multicaster object can receive an event notification generated by the event-generating software component and can forward the received event notification to the first listener software component and to the second listener software component;
(e) receiving a request to register a third listener software component to receive an event notification generated by the event-generating software component;
(f) adding a second reusable event multicaster object, retrieved from a plurality of available reusable event multicaster objects, to the event notification system; and
(g) reconfiguring the event notification system such that the second reusable event multicaster object can receive an event notification from the first reusable event multicaster object and can forward the received event notification to the second listener software component and also such that the first reusable event multicaster object can forward a received event notification to the first listener software component.

13. The event transmission method of claim 12, comprising the steps of:
(a) receiving a request to unregister the second listener software component so that it can not receive an event notification generated by the event-generating software component;
(b) removing the first reusable event multicaster object from the event notification system and returning it to the plurality of available reusable event multicaster objects; and
(c) restructuring the event notification system such that the first listener software component can receive an event notification generated by the event-generating software component.

14. The event transmission method of claim 12, comprising the step of incorporating a third listener software component into the event notification system such that the second reusable event multicaster object can receive an event notification from the first reusable event multicaster object and can forward the received event notification to the third listener software component.

15. The event transmission method of claim 12, comprising the step of generating an event notification in response to an event.

16. The event transmission method of claim 15, comprising the step of communicating the event notification from the event-generating software component to the first listener software component.

17. A component model for use in a time sensitive embedded software application, comprising:
an event-generating software component, comprising code to generate a notification in response to an event;
a first listener software component, comprising code to receive an event notification;
a second listener software component, comprising code to receive an event notification;
one or more additional listener software components, each comprising code to receive an event notification;
an event transmission object, said event transmission object comprising a primitive data type parameter that conveys data describing an event generated by said event-generating software component to said first listener software component;
a first reusable event multicaster object, comprising a first reference, said first reference identifying said first listener software component, said first reusable event multicaster object further comprising a first multicaster object event input interface by which said first reusable event multicaster object can receive said event transmission object and pass, via said first reference, said event transmission object to said first listener software component; and one or more additional reusable event multicaster objects, each said one or more additional reusable event multicaster objects comprising a first object reference and a second object reference;

wherein said one or more additional reusable event multicaster objects, said second listener software component and said one or more additional listener software components are linked via each of said first object references and each of said second object references such that a system having "n" listener software components will have "n-1" reusable event multicaster objects, "n" rep resenting any positive integer greater than positive three.

18. An event transmission method for use in a time sensitive embedded software application, comprising the steps of:

(a) establishing an event notification system having an event-generating software component and a first listener software component registered to receive an event notification generated by the event-generating software component;

(b) receiving a request to register a second listener software component to receive an event notification generated by the event-generating software component;

(c) adding a first reusable event multicaster object, retrieved from a plurality of available reusable event multicaster objects, to the event notification system such that the first reusable event multicaster object can receive an event notification generated by the event-generating software component and can forward the received event notification to the first listener software component;

(d) adding a second reusable event multicaster object, retrieved from a plurality of available reusable event multicaster objects, to the event notification system;

(e) adding a second listener software component to the event notification system;

(f) adding a third listener software component to the event notification system; and (g) reconfiguring the event notification system such that the second reusable event multicaster object can receive an event notification from the first reusable event multicaster object and such that the first reusable event multicaster object can forward a received event notification to one of the listener software components and such that the second reusable event multicaster object can forward a received event notification to two of the listener software components.

* * * * *